(12) United States Patent
Ho et al.

(10) Patent No.: US 8,526,440 B2
(45) Date of Patent: Sep. 3, 2013

(54) PARTIAL RADIO LINK CONTROL STATUS REPORT

(75) Inventors: Sai Yiu Duncan Ho, San Diego, CA (US); Ashwini Raina, Poway, CA (US); Gang A. Xiao, San Diego, CA (US); Shailesh Maheshwari, San Diego, CA (US); Vanitha A. Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 656 days.

(21) Appl. No.: 12/430,646

(22) Filed: Apr. 27, 2009

(65) Prior Publication Data
US 2009/0268683 A1 Oct. 29, 2009

Related U.S. Application Data

(60) Provisional application No. 61/048,490, filed on Apr. 28, 2008.

(51) Int. Cl.
*H04W 4/00* (2009.01)
*H04J 3/00* (2006.01)
*H04L 12/28* (2006.01)

(52) U.S. Cl.
USPC ............ 370/394; 370/329; 370/341; 370/345

(58) Field of Classification Search
USPC ....................................................... 370/329
See application file for complete search history.

(56) References Cited

U.S. PATENT DOCUMENTS

| 6,434,147 | B1 | 8/2002 | Brown et al. | |
|---|---|---|---|---|
| 6,831,912 | B1 * | 12/2004 | Sherman | 370/349 |
| 2005/0066255 | A1 | 3/2005 | Jiang | |
| 2007/0264932 | A1 * | 11/2007 | Suh et al. | 455/13.1 |
| 2009/0232069 | A1 * | 9/2009 | Sun et al. | 370/329 |

FOREIGN PATENT DOCUMENTS

| CN | 1411227 A | 4/2003 |
|---|---|---|
| CN | 1667994 A | 9/2005 |
| CN | 1852076 A | 10/2006 |

(Continued)

OTHER PUBLICATIONS

International Search Report and Written Opinion—PCT/US2009/041982, International Search Authority—European Patent Office—Oct. 27, 2009.

(Continued)

*Primary Examiner* — Derrick Ferris
*Assistant Examiner* — Kodzovi Acolatse
(74) *Attorney, Agent, or Firm* — Nerrie M. Zohn

(57) ABSTRACT

Systems and methodologies are described that facilitate formation and/or dispatch of radio link control (RLC) protocol status reports to a base station. The system can include components that quantify an absence of protocol data units, ascertain whether a number of absent protocol data units exceeds the size of a transmission side grant, insert a sequence number associated with a first absent protocol data unit into an acknowledgement sequence number field associated with a partial status report, incorporates the sequence number associated with the first absent protocol data unit in the partial status report, includes sequence numbers of subsequent absent protocol data units into the partial status report without exceeding the transmission side grant, and sends the partial status report to the base station.

40 Claims, 11 Drawing Sheets

(56) References Cited

FOREIGN PATENT DOCUMENTS

| | | |
|---|---|---|
| CN | 101030840 A | 9/2007 |
| EP | 1018817 A2 | 7/2000 |
| EP | 1550235 A1 | 7/2005 |
| TW | 200637396 | 10/2006 |
| WO | WO0167664 A2 | 9/2001 |
| WO | 2009096743 A2 | 8/2009 |
| WO | 2009099369 A1 | 8/2009 |

OTHER PUBLICATIONS

Ericcson, Clarification to the Handling of Large RLC Status Reports, 3GPP TSG-RAN2#61b R2-082012, Apr. 4, 2008, URL,http://www.3gpp.org/ftp/tsg_ran/WG2_RL2/TSGR2_61bis/Docs/R2-082012.zip.

Taiwan Search Report—TW098114091—TIPO—Jul. 16, 2012.

* cited by examiner

PARTIAL RADIO LINK CONTROL STATUS REPORT

CLAIM OF PRIORITY UNDER 35 U.S.C. §119

This application claims the benefit of U.S. Provisional Patent application Ser. No. 61/048,490 entitled "A METHOD AND APPARATUS FOR PARTITIONING RLC STATUS REPORT" which was filed Apr. 28, 2008. The entirety of the aforementioned application is herein incorporated by reference.

BACKGROUND

I. Field

The following description relates generally to wireless communications, and more particularly to forming and sending a partial status report that will fit in an uplink grant or downlink assignment.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

The Radio Link Control (RLC) protocol is typically responsible for segmentation of (header-compressed) Internet Protocol (IP) packets from the Packet Data Convergence Protocol (PDCP) into smaller units, Radio Link Control (RLC) Protocol Data Units (PDUs). Moreover the RLC protocol is also tasked with retransmission of erroneously received PDUs, as well as duplicate removal and concatenation of received PDUs. Additionally, the RLC ensures in-sequence delivery of RLC Service Data Units (SDUs) to upper layers.

The RLC retransmission mechanism can be responsible from providing error-free delivery of data to higher layers. This can be accomplished by a transmission protocol that operates between the RLC entities in the receiver and the transmitter. By monitoring the sequence numbers, the receiving RLC can identify missing PDUs. Status reports can then be fed back to the transmitting RLC, requesting retransmission of missing PDUs. When to feedback a status report can be configurable, but a report typically contains information about multiple PDUs and is generally transmitted relative infrequently. Based at least in part on the received status report, the RLC entity at the transmitter can take appropriate action and retransmit the missing PDUs if required.

When the RLC is configured to request retransmission of missing PDUs, it is said to be operating in Acknowledge Mode (AM) which is typically employed for Transmission Control Protocol (TCP) based services such as file transfer where error free data delivery is necessary.

The RLC can also be configured in Unacknowledged Mode (UM) and Transparent Mode (TM). In UM, in-sequence delivery to higher layers can be provided, but no retransmissions of missing PDUs are requested. Generally, UM is utilized for services such as Voice over Internet Protocol (VoIP) services where error free delivery is less of a concern compared to short delivery time. TM, although supported, is only used for specific purposes such as random access.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In LTE, all uplink (UL) transmission requires an UL grant. The UL grant may or may not be large enough to accommodate an RLC Status Report. When the UL grant is not large enough, the UE needs to form a "partial status report" where only a subset of the negative acknowledgement sequence numbers can be included. When forming a partial status report an access terminal, the user equipment (UE) can set the Acknowledgment Sequence Number (ACK SN) field in the status report to the sequence number of the first missing Protocol Data Unit (PDU), VR(R), and can include (from the oldest Negative Acknowledgement Sequence Number (NACK SN)) as many NACK SNs as possible so that the report still fits into the UL grant. In this manner, the receiving base station or eNodeB (eNB) can do a comparison where: if the ACK SN received in the report is less than or equal to the lowest sequence number of a missing PDU that the access terminal can include in the status report, VR(MS), the eNB can conclude this is a partial status report. Otherwise the base station or eNB can perceive the received status report as being a complete or full status report rather than a partial status report. Once the access terminal or user equipment commences dispatch of the first partial status report, it will continue disseminating partial reports to the base station or eNB until all the NACK SNs have been included (e.g., up to the VR(MS) value that was indicated in the initial or first partial report sent to the base station or eNB). As will be appreciated by those of moderate skill in this field of endeavor, all the NACK SNs will be included in the partial status reports sent to the base station or eNB at most once. Additionally, it should further be noted that when the base station or user equipment commences dispatch of partial status reports, a status report prohibit timer will only be started after all the NACK SNs identified during the formation of the first or initial partial status report have been reported to the base station or eNB. The purpose of the status report prohibit timer is to prevent the UE from sending status reports too frequently. So in the full status report case, the timer should be started after sending the full status report. However, in the case of partial status report, the timer should not be started until the very last partial status report has been sent out so the UE can send out all the remaining partial status reports as soon as possible.

The claimed subject matter in accordance with one or more aspects discussed and elucidated herein relates to systems and/or methods that form and/or send radio link control (RLC) protocol status reports in a wireless communication environment. In accordance with an aspect, the claimed subject matter provides an apparatus that quantifies an absence of protocol data units and based at least in part on such an absence ascertains whether or not the number of absent protocol data units (PDUs) exceeds a transmission side grant (e.g., uplink grant and/or downlink assignment). Where it is ascertained that the number of absent protocol data units (PDUs) exceeds the transmission side grant, the apparatus can insert the sequence number associated with the first absent protocol data unit (PDU) into an acknowledgement sequence number field associated with a partial status report as well as include the sequence number associated with the first absent protocol data unit into the partial status report. Additionally, the apparatus can also include the sequence numbers of subsequent absent protocol data units into the partial status report while ensuring that the transmission side grant is not exceeded, and can thereafter dispatch the constructed partial status report to a base station.

In accordance with a further aspect, the claimed subject matter provides a method utilized in a wireless communication system, wherein the method includes inserting a sequence number associated with a first absent protocol data unit into an acknowledgement sequence number field associated with a status report and also inserting the sequence number associated with the first absent protocol data unit into the status report. The method further includes inserting sequence numbers of additional absent protocol data units into the status report without exceeding a transmission side grant, and thereafter dispatching the status report to a base station.

In accordance with yet a further aspect, the claimed subject matter provides an apparatus operable in wireless communication systems that includes means for detecting missing protocol data units and stopping a means for determining time, means for constructing status reports with sequence numbers of the missing protocol data units, and means for restarting the means for determining time on inclusion of the sequence number associated with the last missing protocol data unit detected prior to stopping the means for determining time.

Additionally, in accordance with another aspect, the claimed subject matter provides an apparatus operable in wireless communication systems that includes a memory that retains instructions related to quantifying an absence of protocol data units, ascertaining whether the quantity of absent protocol data units exceeds a transmission side grant supplied by a base station, including the sequence number affiliated with the first absent protocol data unit in the sequence number field associated with a status report, placing the sequence number affiliated with the first absent protocol data unit into the status report, placing sequence numbers affiliated with further absent protocol data units into the status report, and transmitting the status report to the base station.

Furthermore, the claimed subject matter also provides computer-readable media having stored thereon machine-executable instructions for including a sequence number associated with a first missing protocol data unit into a sequence number field affiliated with a status report, placing the sequence number associated with the first missing protocol data unit into the status report, placing a sequence number of a second missing protocol data unit into the status report, and subsequently sending the status report to a base station.

In accordance with yet a further aspect, the claimed subject matter provides an apparatus that includes a processor configured to receive status reports that include acknowledgement sequence number fields, investigate the acknowledgement sequence number fields to ascertain whether the sequence number of the first missing protocol data unit included in the status report is present, comparing the sequence number of the first missing protocol data unit with the sequence number of the lowest permissible protocol data unit, and based on the comparison, supplying a grant to an access terminal.

Furthermore, the claimed subject matter also provides methods that can be employed in wireless communication systems, wherein the methods include obtaining status reports that include acknowledgement sequence number fields, investigating the acknowledgement sequence number fields to ascertain whether the sequence number of the first missing protocol data unit included in the status report is present, comparing the sequence number of the first missing protocol data unit with the sequence number of the lowest permissible protocol data unit, and based on such a comparison, supplying a grant from a transmission side to an access terminal.

Moreover, in accordance with yet another aspect, the claimed subject matter provides an apparatus comprising, means for retrieving a status report that includes an acknowledgement sequence number field that includes a sequence number associated with a first missing protocol data unit, means for distinguishing between a partial status report and a full status report, and means for providing further grants from a transmission side to ensure that all missing protocol data units are reported in one of a partial status report or a full status report.

Additionally, in accordance with a further aspect, the claimed subject matter provides a computer-readable medium having stored thereon machine-executable instructions for investigating the acknowledgement sequence number field of a received status report to ascertain whether the sequence number of the first missing protocol data unit included in the status report is present, comparing the sequence number of the first missing protocol data unit with the sequence number of the lowest permissible protocol data unit, and based on the comparison between the sequence number of the first missing protocol data unit and the sequence number of the lowest permissible protocol data unit, supplying a grant from a transmission side to an access terminal.

In accordance with yet a further aspect, the claimed subject matter provides an apparatus operable in a wireless communications environment, wherein the apparatus comprises a memory that retains instructions related to receiving a status report that includes an acknowledgement sequence number field, investigating the acknowledgement sequence number field to ascertain whether the sequence number of the first missing protocol data unit included in the status report is present, comparing the sequence number of the first missing protocol data unit with the sequence number of the lowest permissible protocol data unit, and based on the comparison between the sequence number of the first missing protocol data unit and the sequence number of the lowest permissible protocol data unit, supplying a grant from a transmission side to an access terminal.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
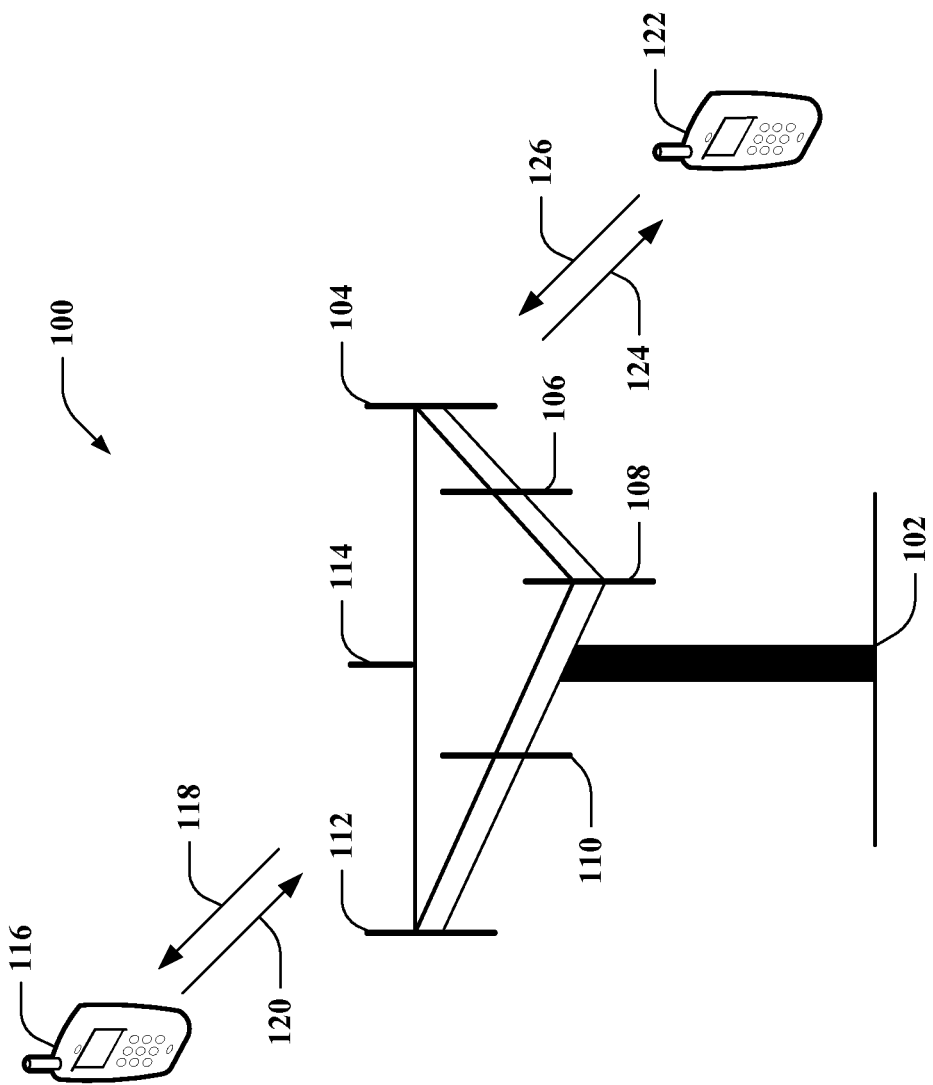
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency.

Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Prior to embarking on an extensive discussion and overview of the claimed subject matter, it should be noted, without limitation or loss of generality, that while the claimed matter is explicated in terms of uplink grants, the claimed subject matter, with equal functionality and/or facility, can have application with regard to downlink assignments where missing Protocol Data Units (PDUs) are reported by base stations or eNBs, and as such it is the task of the base station or eNB to form and/or dispatch partial status reports to access terminals or user equipment. Accordingly, depending on circumstances, the term "transmission side grant" or "grant from the transmission side" is intended to connote "uplink grants" and/or "downlink assignments".

Currently in Long-Term Evolution (LTE), there is a format for Radio Link Control (RLC) protocol Status Reports that includes all the missing RLC Protocol Data Units (PDUs) Sequence Numbers (SNs) (e.g., Negative Acknowledgement Sequence Numbers (NACK SNs)). As will be appreciated, since the report needs to include all the missing RLC PDUs, the greater the number of missing RLC PDUs, the longer the report can be. As a consequence, it is possible that the resultant report can become too big to fit into the uplink (UL) grant and as such cannot be transmitted at all. To overcome this limitation, it has been proposed that partial status reports be dispatched from the access terminal or user equipment to the eNB or base station, wherein the partial report includes as many missing PDU SNs as is possible and permissible give the stricture of the UL grant.

It has been observed that the status report dispatched to the base station or eNB by the access terminal has an ACK SN field that has typically been set to the sequence number of first missing PDU's SN (e.g., the first missing PDU SN not included in the report sent to the base station or eNB). Thus, under the current design if PDUs with SN 1, 2, 3, 4, 5, 6, 7, 8, 9, and 10 were lost and the UL grant were set to 5 (e.g., five PDU SNs can be dispatched in a report), the report will include PDU SNs 1, 2, 3, 4, and 5, and the ACK SN field will be set to 6 (e.g., the first missing PDU SN not included in the report being sent to the base station or eNB). The problem with this is that when the base station or eNB receives the status report it is unable to discern whether the report that it just received is a partial status report and that there are more missing PDU SNs yet to be to reported by the access terminal or user equipment, or whether the report that it has received is a full report of all the missing PDU SNs and that no further PDU SNs need to be reported by the access terminal or user equipment as missing. Where the base station or eNB is under the impression that it has received a full report, but in actuality the access terminal or user equipment has more missing PDU SNs to report and send, the base station or eNB will not provide further UL grants to the access terminal or user equipment for the access terminal or user equipment to include the additional missing PDU SNs that have yet to be reported to the base station or eNB.

To overcome the foregoing difficulties and uncertainties, the claimed subject matter in accordance with an aspect provides indication to the base station or eNB that the status report sent by the access terminal or user equipment to the base station or eNB is either a partial status report, in which case the base station or eNB should provide UL grants sufficient to facilitate dispatch of additional missing PDUs in subsequent partial status reports to the base station or eNB, or the status report sent by the access terminal or user equipment to the base station or eNB is a full or complete status report, in which case the base station or eNB need not provide further UL grants as there are no further missing PDUs.

Figure 2:
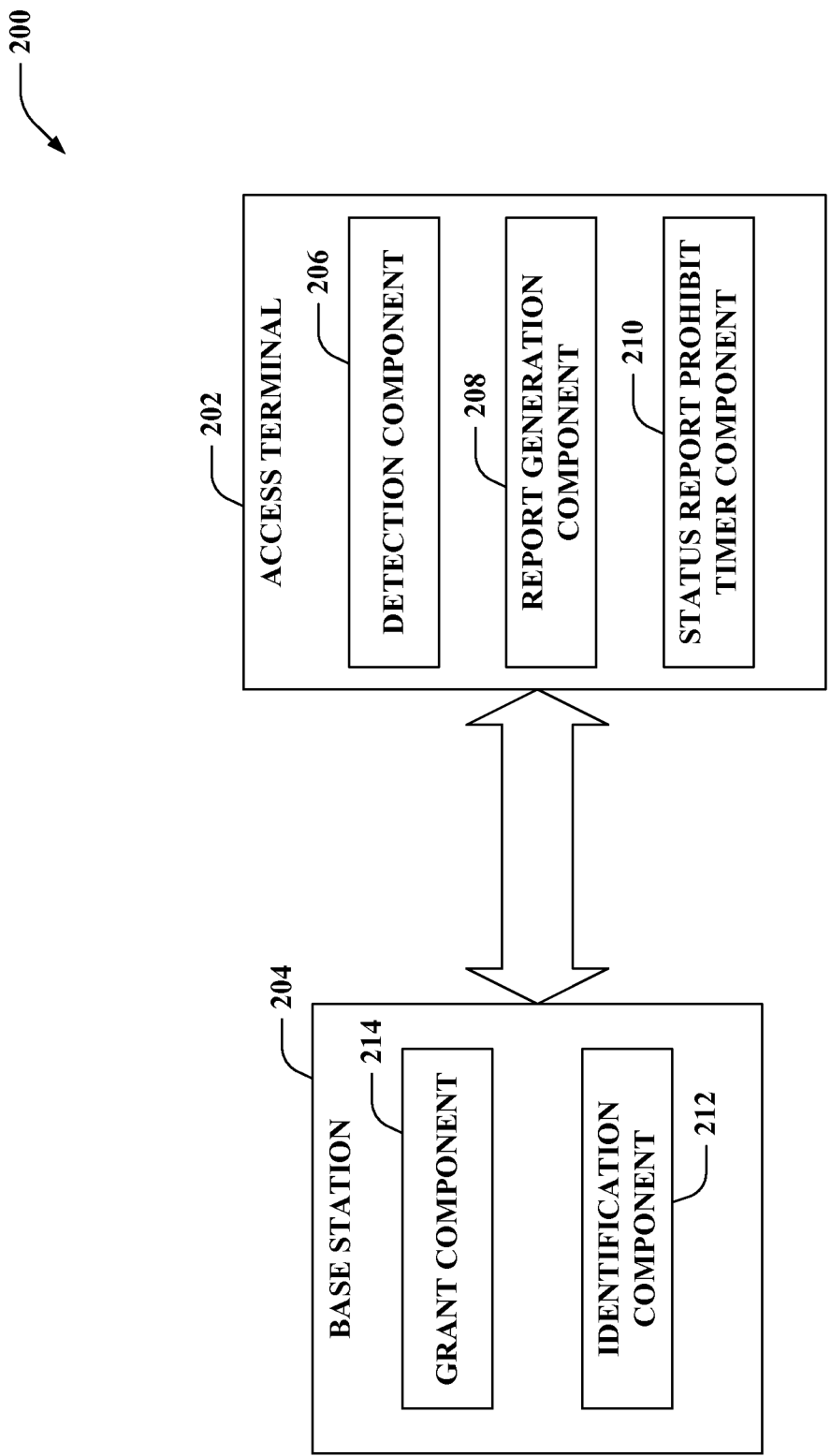
FIG. 2 is an illustration of an example system that forms and/or sends radio link control (RLC) protocol status reports in a wireless communication environment.

FIG. 2 provides illustration of a system 200 that forms and/or sends radio link control (RLC) protocol status reports in accordance with an aspect of the claimed subject matter. As depicted, system 200 can include access terminal 202 that can be in continuous and/or operative or sporadic and/or intermittent communication with base station 204 and/or with the greater cellular system or core network (e.g., $3^{rd}$ Generation (3G) cellular systems) through facilities and/or functionalities provided by one or more radio network controller (not shown). Access terminal 202, as exemplified above in context with access terminals 116 and 122, can be implemented entirely in hardware and/or a combination of hardware and/or software in execution. Further access terminal 202 can be incorporated within and/or be associated with other compatible components. Additionally, access terminal 202 can be, but is not limited to, any type of machine that includes a processor and/or is capable of effective communication with the core cellular network through the functionalities provided by base station 204 and radio network controller (not shown). Illustrative machines that can comprise access terminal 202 can include desktop computers, cellular phones, smart phones, laptop computers, notebook computers, Tablet PCs, portable consumer and/or industrial devices, components, and/or appliances, hand-held devices, personal digital assistants, multimedia Internet enable phones, multimedia players, and the like.

Access terminal 202 as is further illustrated in FIG. 2 can include detection component 206, report generation component 208, and status report prohibit timer component 210. Detection component 206 can be responsible for detecting whether or not Protocol Data Units (PDUs) dispatched from base station 204 servicing access terminal 202 are missing. Detection component 206 can determine whether or not PDUs are missing based at least in part on a sequence number that can be associated with each and every PDU disseminated by base station 204. For example, detection component 206 can note that PDUs with sequence numbers 1, 2, 5, 6, 8, and 9 were received and that PDUs 3-4 and 7 are currently missing. Where detection component 206 ascertains that PDUs are missing it can cause status report prohibit timer component 210 to be put on hiatus (e.g., stopped) and can further instigate report generation component 208 to commence generating status reports that include the sequence numbers of the PDUs that have been detected or are ascertained to be missing.

Report generation component 208 can be responsible for creating status reports that are sent to the servicing base station (e.g., base station 204). Report generation component 208 can commence operation at the instigation of detection component 206 where upon it can start constructing a status report to be sent to the servicing base station. Based at least in part on the size of uplink (UL) grant that has been provided and supplied by base station 204 to access terminal 202, report generation component 208 can either supply a complete status report or a partial status report. For instance, if very few PDUs are reported by detection component 206 as being missing, and depending on the size of the uplink grant allocated by base station 204 for this purpose, report generation component 208 can place all the sequence numbers associated with the noted missing PDUs into a single status report and thereafter can send the report to the serving base station 204. Alternatively, where the number of the missing PDUs are too numerous to be able to comport with the size of the uplink (UL) grant, report generation component 208 can package the sequence numbers of the missing PDUs into one or more partial status reports so that each report sent can comport with the uplink (UL) grant provided by the serving base station 204 for this purpose. Report generation component 208 when packaging the sequence numbers of the missing PDUs into partial status reports can include or insert the sequence number of the first detected and missing PDU into the ACK SN field associated with the partial status report. As will be appreciated, where multiple partial status reports are sent in quick succession to the serving base station 204 in order to notify base station 204 of the sequence numbers of all the missing PDUs that have failed to be received up until a particular point in time, the sequence number of the first PDU in the "queue" can be inserted into the ACK SN field associated with the partial status report to be dispatched to base station 204. For instance, if the following PDU sequence numbers are missing: 5, 7-8, 11, 13, and 15, and the uplink grant allows for the partial report to include only three sequence numbers, a first partial status report can be constructed by report generation component 208 that includes sequence numbers 5, 7, and 8 and where sequence number 5 can be inserted into the ACK SN field associated with the first partial status report sent to base station 204. Further, a second partial report (remembering that the uplink grant in this instance permits the inclusion of only three sequence numbers) can include sequence numbers 11, 13, and 15, but in this case sequence number 5 can be associated with the ACK SN field of the second partial status report sent to base station 204. Once report generation component 208 has packaged and/or dispatched notification of all missing PDUs, report generation 208 can reset, restart, and/or bring the status report prohibit timer component 210 out of its hiatus.

Status report prohibit timer component 210 associated with access terminal 202 can be a timer that acts as a governor as to when and if status reports should be generated and dispatched to a servicing base station (e.g., base station 204). When status report prohibit timer component 210 is stopped or temporarily placed on hiatus, this can signify to report generation component 208 that it should construct status reports that include PDUs that have been detected as missing, and should continue to do so (e.g., creating status reports) until there are no further missing PDUs to report to the servicing base station (e.g., base station 204). Once there are no further PDUs to report to base station as missing, status report prohibit timer component 210 can be restarted or brought out of hiatus which can be indication that no further status report generation should be conducted and further that all status reports (e.g., partial and/or full) that were needed to be dispatched to base station 204 have been sent.

Base station or eNodeB 204 (hereinafter referred to as "base station 204") is typically employed to communicate directly with one or more mobile device, access terminal, or other user equipment, such as access terminal 202 described above. Since the basic functionality of base station 204 has been elucidated above, a detailed description of such features has been omitted for the sake of brevity and conciseness. Nevertheless, as illustrated base station 204 can include identification component 212 and grant component 214. Identification component 212 can distinguish as to whether or not the report that has been received from access terminal 202 relates to a partial status report or a full status report. Identification component 212 can determine whether or not the report that has be received from access terminal 202 is a partial status report or a full status report by investigating whether or not the ACK SN field associated with the incoming status report is less than the first missing PDU indicated in the report. If the sequence number of the first missing PDU is greater than or equal to the ACK SN field associated with the incoming status report, this indicates that access terminal 202 has sent a partial report. On the other hand, where the ACK SN field is less than or equal to the sequence number of the first missing PDU indicated in the report, then this indicates that the report sent by communicating access terminal 202 is a complete or full status report. Once it has been ascertained whether or not a partial status report or full or complete status report has been received, identification component 212 can compare the value contained in the ACK SN field associated with the incoming partial status report with the lowest sequence number of a missing PDU that could permissibly have been included in the status report. Based at least in part on this determination, grant component 214 can supply further uplink grants to access terminal 202 so that any further missing PDUs that still need to be reported to base station 204 can be transmitted. Conversely, if the ACK_SN field contains a sequence number that is greater than the first missing PDU indicated in the report, this can provide indication that access terminal 202 has either sent a full status report or alternatively has completed transmission of all the partial status reports and consequently base station 202 (via grant component 214) need not supply or allocate further UL grants for this purpose.

It should be noted, without limitation or loss of generality, in connection with grant component 214 and the allocation and/or supply of uplink grants to access terminal 202 that the uplink grants supplied or provided to access terminal 202 can be of variable sized depending on environmental conditions and situational constraints with respect to the location of where access terminal 202 is receiving and/or transmitting from. Thus, in one instance in time the uplink grant supplied and/or allocated to access terminal 202 can be generous, whereas in another instant in time the uplink grant allocated and/or provided to access terminal 202 can be much more constrained.

Figure 3:
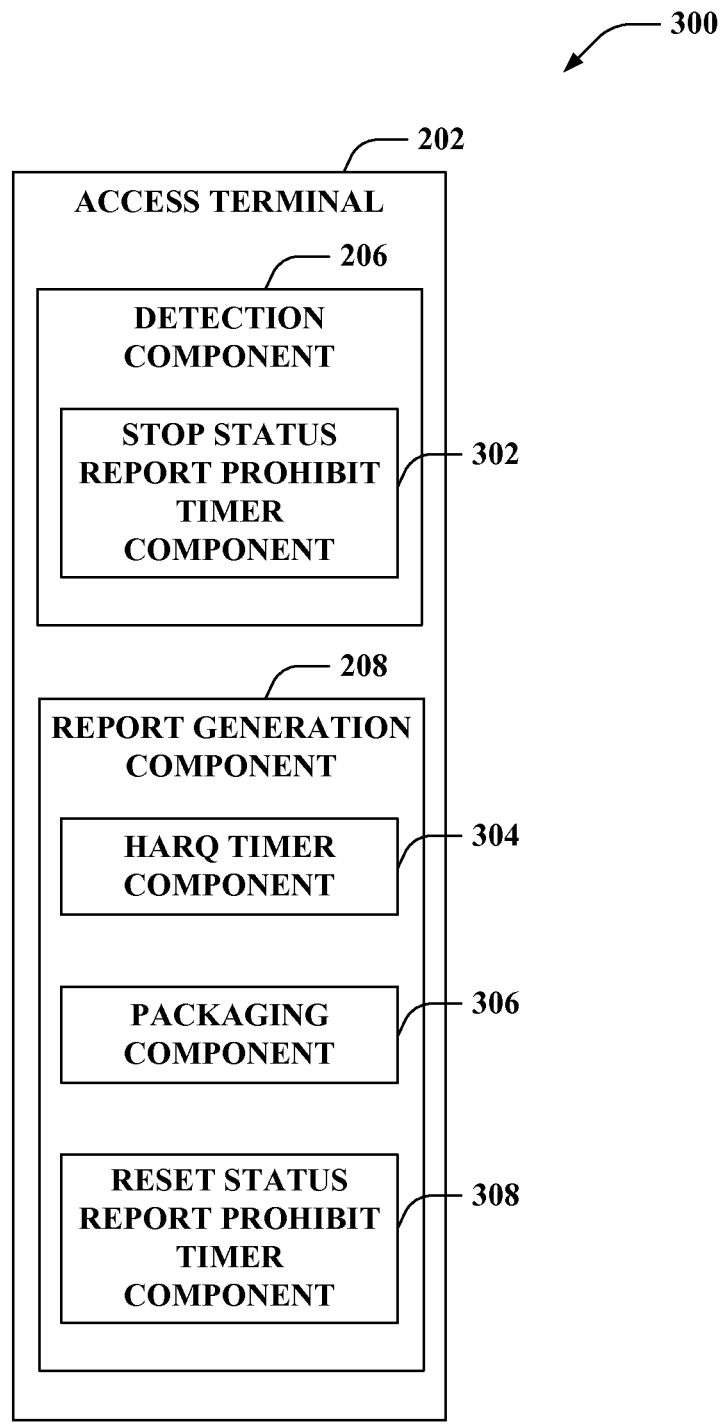
FIG. 3 is an illustration of an example system that forms and/or sends radio link control (RLC) protocol status reports in a wireless communication environment.

FIG. 3 provides depiction of a system 300 that forms and/or sends radio link control (RLC) protocol status reports in accordance with a further aspect of the claimed subject matter. In particular, FIG. 3 provides more detailed depiction of access terminal 202 wherein detection component 206 and report generation component 208 are further elucidated. As illustrated, detection component 206 in addition to the functionalities outlined above in relation to FIG. 2 can also include stop status report prohibit timer component 302 that can place status report prohibit timer component 210 on hiatus. The functionality of stop status report prohibit timer component 302 can be initiated when and if detection component 206 detects gaps in the sequence numbers of the incoming PDUs.

Report generation component 208 can further include hybrid automatic repeat request (HARQ) timer 304 that can be utilized by report generation component 208 before it commences building status reports that include missing PDU sequence numbers. HARQ timer 304 can be utilized by report generation component 208 in recognition of the fact that the hybrid repeat request (HARQ) protocol typically does not or may not supply the PDUs in sequential order. Thus, PDUs can be delivered in a non-sequential or even a random order, and though out of sequence, are nonetheless not necessarily missing—merely disordered and/or yet to arrive. Accordingly, to interpose a moment of quiescence and to ensure that PDUs that have been received and/or are forthcoming, albeit out of order, can be appropriately ordered and noted as being present, HARQ timer 304 can be employed to ensure that PDUs received in such non-sequential order can be recognized as having been received and that PDUs that are truly missing can be accorded the appellation of being unaccounted for or missing.

Additionally, report generation component 208 can also include packaging component 306 that can take into account the size of the current uplink grant provided by base station 204 in the construction of status reports for delivery to a serving base station 204. As will be appreciated by those cognizant in this field of endeavor, the uplink grant provided by base station 204 can vary between instances of time depending on environmental conditions and situational constrains in which the access terminal (e.g., access terminal 202) find itself. Thus, where the uplink grant provided by the serving base station is generous and/or the quantity of missing PDUs detected are few, packaging component 306 can create a full status report that includes all missing PDUs noted prior to the time that detection component 206 (e.g., through the facilities of stop status report prohibit timer component 302) placed status report prohibit timer component 210 in a stop condition or on hiatus. Conversely, where the uplink grant provided by the serving base station is parsimonious and/or the number of detected missing PDUs is great, packaging component 306 can create partial status reports placing as many sequence numbers of missing PDUs in each partial status report as is possible given the constraints of the uplink grant. Additionally, in the case of partial status reports, packaging component 306 can also include or insert the sequence number of the first missing PDU appearing in the partial report into the ACK SN field associated with the partial report. For example, if PDUs with the following sequence numbers have been reported missing: 45, 50, 56, 66, 69, and 72 and the current uplink grant permits two sequence numbers to be includable in the forth coming status reports, packaging component 306 can include sequence numbers 45 and 50 in a first partial status report and can further insert sequence number 45 into the ACK SN field associated with the first partial status report; can include sequence numbers 56 and 66 in a second partial status report and can additionally insert sequence number 45 into the ACK SN field associated with the second partial status report; and can include sequence numbers 69 and 72 in a third partial status report and can further insert sequence number 45 into the ACK SN field of the third partial status report. In this manner, when the serving base station receives each of the partial status reports it can discern that the reports that have been received are partial status reports rather than complete or full status reports and as such can allocate further uplink grants to the access terminal so that the access terminal can employ these additional uplink grants to convey further partial status reports to the base station. As will be appreciated by those of moderate skill in this field of endeavor, the constructing of partial status reports to comport with the current strictures of the uplink grant provided by the serving base station and the allocation of further uplink grants by the serving base station to accommodate transmission of additional partial status reports from the interchanging access terminal, can be repeated until there are no further missing PDU sequence numbers (e.g., as previously ascertained by detection component 206) to report to the serving base station.

Further, report generation component 208 can additionally include reset status report prohibit timer component 308 that can be employed once all the missing PDU sequence numbers as identified by detection component 206 have been reported to the serving base station. Reset status report prohibit timer component 308 can bring the status report prohibit timer component 210 out the hiatus or stopped state that detection component 206 placed it in when detection component 206 detected gaps in the sequence numbers of the incoming PDUs.

Figure 4:
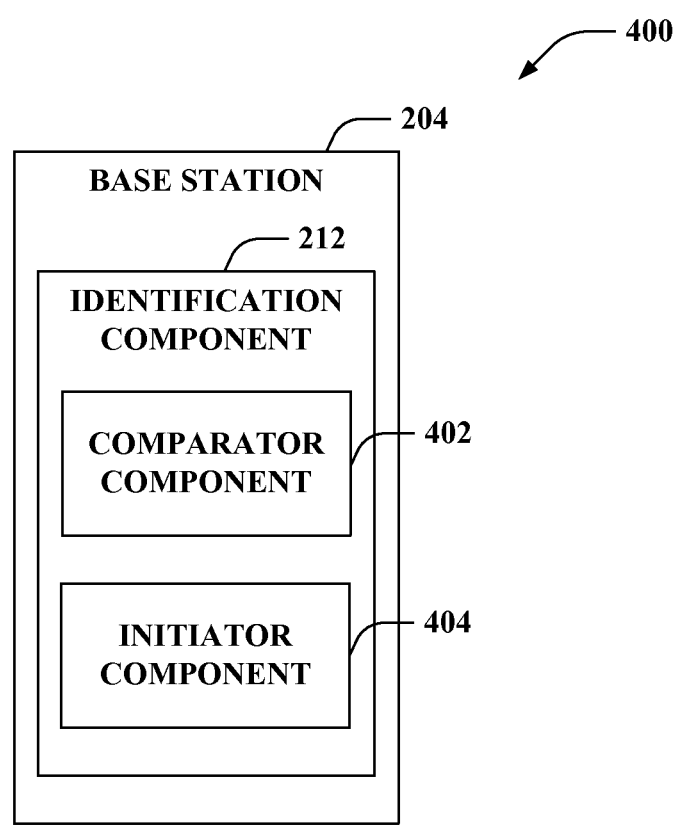
FIG. 4 is an illustration of an example system that forms and/or sends radio link control (RLC) protocol status reports in a wireless communication environment.

FIG. 4 provides further depiction of a system 400 that facilitates and/or effectuates the formation and/or dissemination of radio link control (RLC) protocol status reports in accordance with various aspects of the claimed subject matter, and in particular provides more detailed depiction of identification component 212 associated with base station 204. As depicted, identification component 212 can include comparator component 402 and initiator component 404. Comparator component 402 can be employed to distinguish or differentiate between full status reports and/or partial status reports received from one or more access terminals under the control of base station 204. Comparator component 402 can investigate the ACK SN field associated with the incoming status report to determine whether or not the ACK SN field includes the sequence number that is less than or equal to the first missing PDU SN. Where it is ascertained by comparator component 402 that the ACK SN field associated with the incoming status report contains the sequence number that is less than or equal to the first missing PDU SN included in the status report, this can signify that the status report is a partial status report rather than a full or complete status report. Where on the other hand it is determined by comparator component 402 that the ACK SN field does not contain the sequence number of the first missing PDU included in the status report, this can indicate that the received status report is a full or complete report.

Once comparator component 402 has identified whether or not the incoming status report should be classified as full or partial, comparator component 402 for partial status reports can compare the value included in the ACK SN field associated with the partial status report to ascertain whether or not the value therein is less than the first missing PDU included in the partial status report. Where it is ascertained that the value contained in the ACK SN field of the received partial status report is less than the first missing PDU, comparator component 402 can indicate to initiator component 404 that additional grants need to be provided to the access terminal in order for the access terminal to send all the subsequent missing PDUs that it has noted as being missing or has not received. Where comparator component 402 identifies that the sequence number included in the ACK SN field of the received partial status report is greater than the first missing PDU, this can be indication that no further uplink grants need to be provided to the access terminal to enable it to transmit further partial status reports at this instant in time.

As stated above, initiator component 404 can be employed at the instigation of comparator component 402 to effectuate and/or facilitate allocation of additional uplink grants to the access terminal so that the access terminal can complete sending all the noted and missing PDUs that it has not received. Initiator component 404 when it receives indication from comparator component 402 of a need for the allocation of further uplink grants, in collaboration with grant component 214, can cause appropriate uplink grants to be dispatched to the access terminal so that the access terminal can continue to send as many partial status reports as is necessary to inform the controlling base station (e.g., base station 204) of the sequence numbers of all the PDUs than have not been received by the access terminal.

Figure 5:
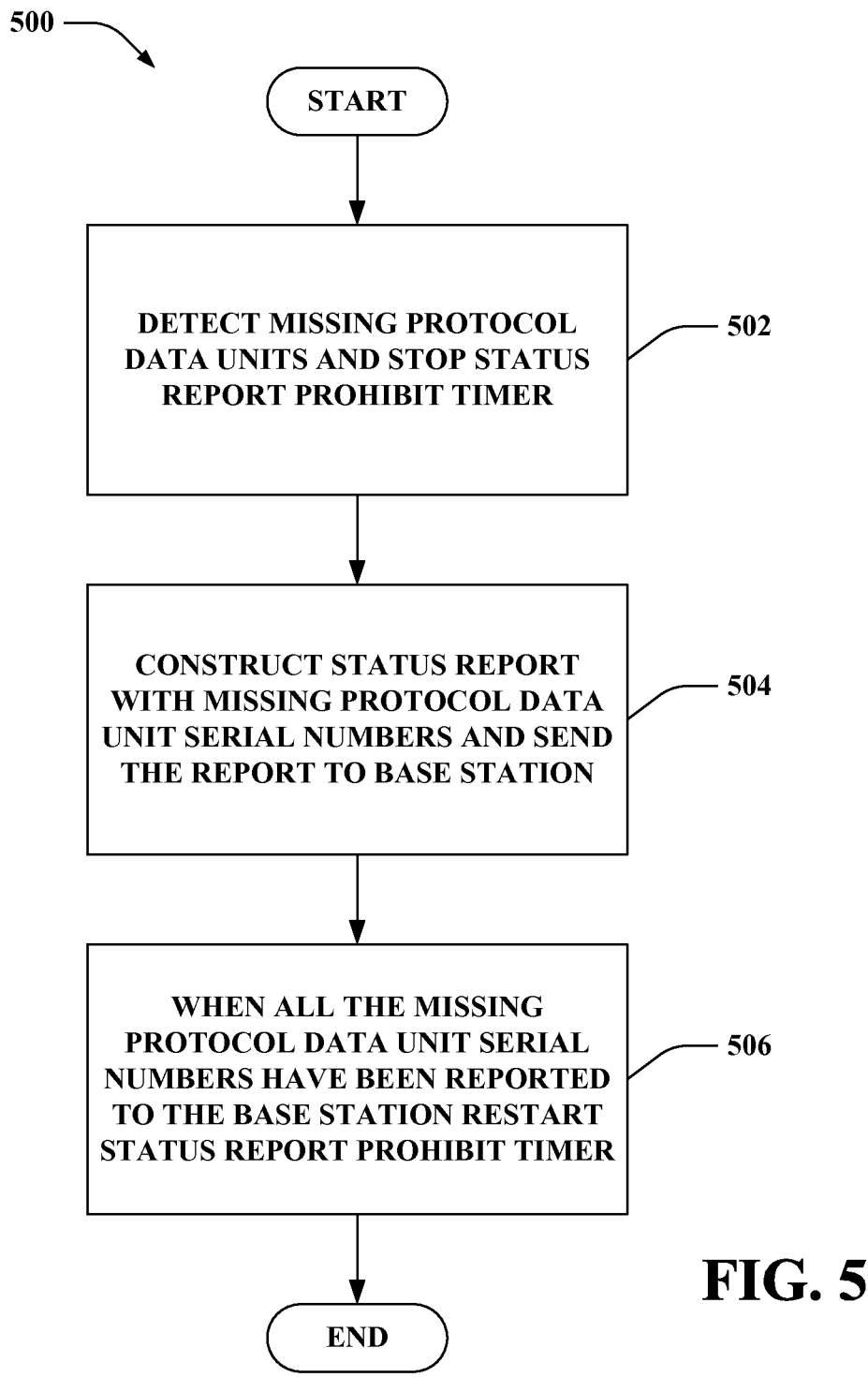
FIG. 5 is a methodology for forming and/or sending radio link control (RLC) protocol status reports in accordance with various aspects of the subject disclosure.
Figure 6:
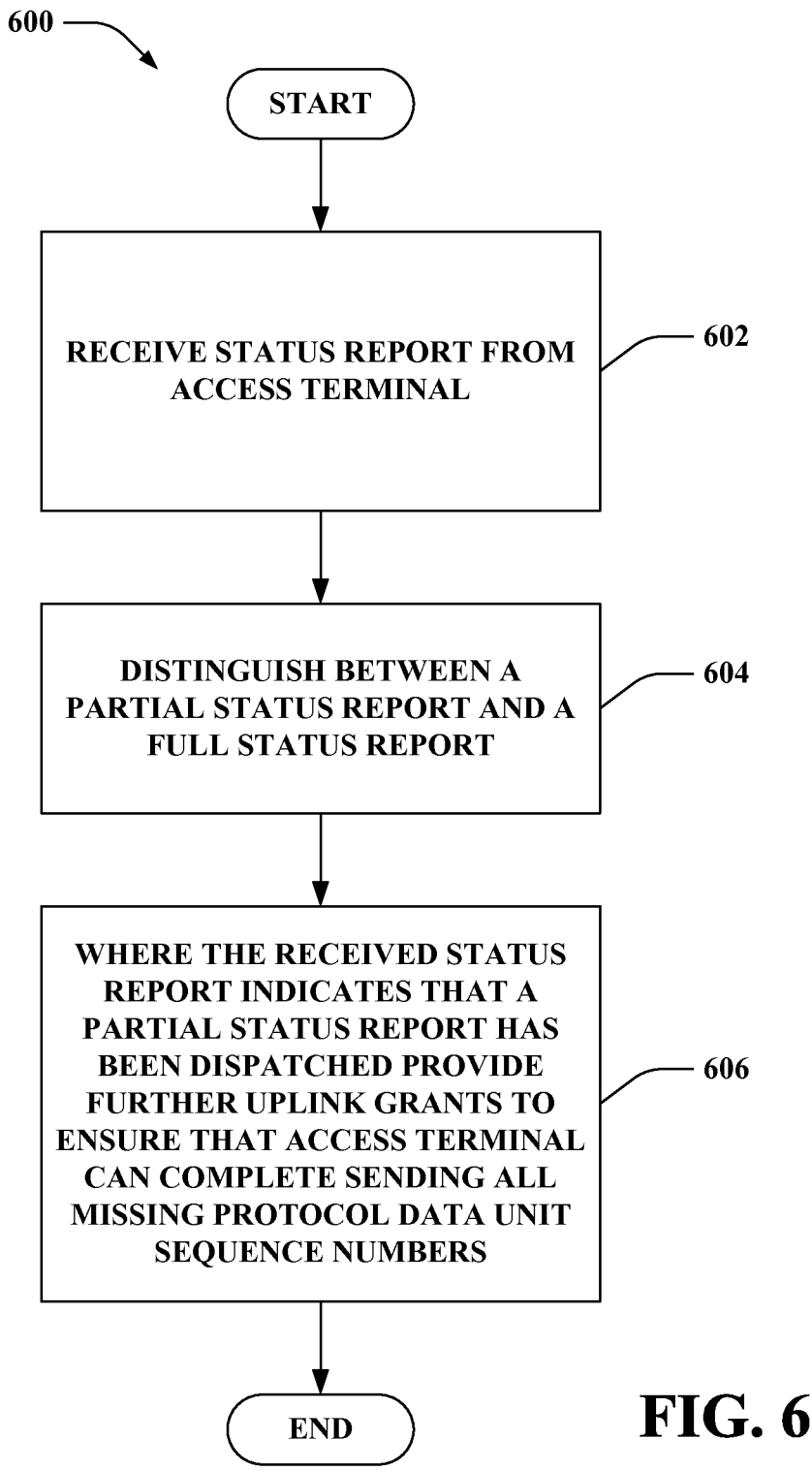
FIG. 6 is a methodology for receiving radio link control (RLC) protocol status reports and, if necessary, dispatching uplink grants or downlink assignments in accordance with various aspects of the subject disclosure.

Referring to FIGS. 5-6, methodologies relating to the formation and/or dispatch of radio link control (RLC) protocol status reports in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 5, illustrated is a methodology 500 that facilitates and/or effectuates the construction and/or dissemination of radio link control (RLC) protocol status reports in accordance with an aspect of the claimed subject matter. Methodology 500 can commence at 502 at which point an access terminal (e.g., access terminal 202) can detect whether or not PDUs have been received. Where the access terminal ascertains that there is a break or gap in the sequence numbers of the PDUs received, the status report prohibit timer (e.g., status report prohibit timer component 210) can be stopped or put in hiatus, at which point methodology 500 can proceed to 504. At 504, based at least in part on the detected or ascertained gap in the sequence numbers of the received PDUs, a partial status report can be constructed that lists the sequence numbers of those PDUs that are missing or have not been received by the access terminal. When creating the partial status report, the sequence number of the first missing PDU can be inserted into the ACK SN field associated with the partial status report. It should be noted, without limitation or loss of generality, that the partial status report generated at 504 needs to comport with the maximum size of the UL grant dictated by the base station or eNB (e.g., base station 204) in correspondence with the access terminal (e.g., access terminal 202). Accordingly, and as will be appreciated by those cognizant in this field of endeavor, act 504 can be repeated one or more times until all the missing PDUs have been reported to the base station or eNB in communication with the access terminal wherein the first missing PDU is inserted into the ACK SN field associated with the partial status report. Once all the missing PDUs have been reported to the base station or eNB (e.g., via dispatch of partial status reports from the access terminal), methodology 500 can proceed to 506 where the status report prohibit timer can be brought out of hiatus or restarted.

FIG. 6 illustrates a method 600 that effectuates and/or facilitates receipt and/or processing of radio link control (RLC) protocol status reports in accordance with an aspect of the claimed subject matter. Method 600 can commence at 602 where a base station or eNB (e.g., base station 204) can receive a status report from an access terminal or user equipment (e.g., access terminal 202) and thereafter method 600 can proceed to 604. At 604 the base station can distinguish as to whether or not the report that has been received pertains to a partial status report or a full status report, such discernment can be carried out by investigating whether or not the ACK SN field associated with the incoming status report is less than the first missing PDU included in the report. If the sequence number of the first missing PDU is greater than or equal to the ACK SN field associated with the incoming status report, this indicates that the access terminal or user equipment has sent a partial report. Conversely, where the ACK SN field is less than or equal to the sequence number of the first missing PDU included in the report then this can be indication that the report sent by the communicating access terminal or user equipment is a complete or full status report. Once it has been ascertained at 604 whether or not a partial status report or full or complete status report has been received, method 600 can proceed to 606. At 606 based at least in part on the identification that the received report is a partial status report the base station can compare the value contained in the ACK SN field associated with the incoming partial status report with the lowest sequence number of a missing PDU that could permissibly have been included in the status report. Based at least in part on this comparison the base station should provide or supply further UL grants to the access terminal, as the access terminal has noted further missing PDUs that still need to be reported to the base station. Conversely, if the ACK SN field contains a sequence number that is greater than the first missing PDU indicated in the report, this can provide indication that the access terminal has completed sending partial status reports (e.g., the access terminal is unaware of any further missing PDUs to report at this point in time) and consequently the base station need not supply or allocate further UL grants for this purpose.

It will be appreciated that, in accordance with one or more aspects described herein, inferences can be made regarding formation and/or dispatch or radio link control (RLC) protocol status reports. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
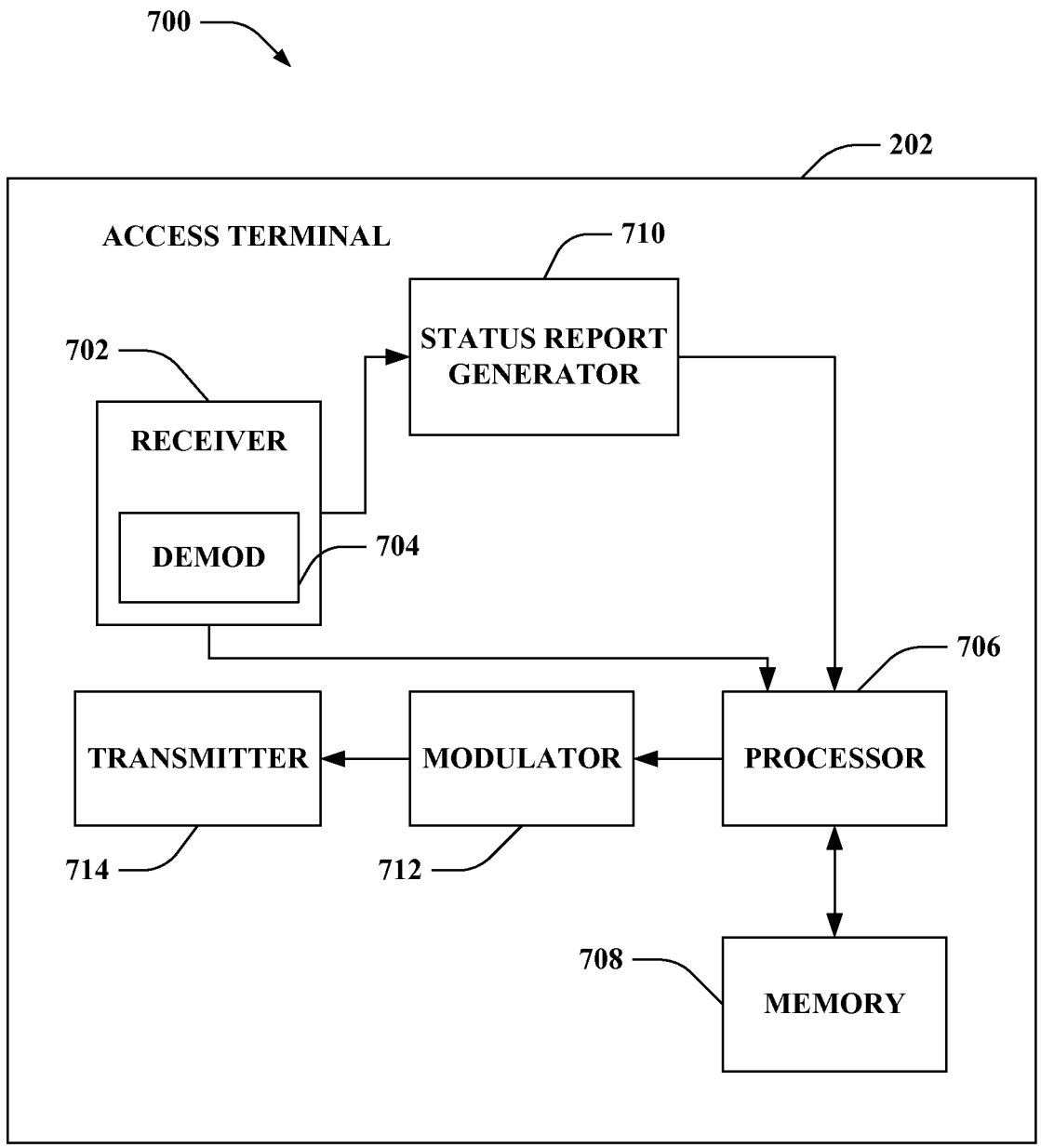
FIG. 7 is an illustration of an example access terminal that forms and/or sends radio link control (RLC) protocol status reports in a wireless communication system.

FIG. 7 is an illustration 700 of an access terminal 202 that effectuates and/or facilitates receipt and/or processing of radio link control (RLC) protocol status reports. Access terminal 202 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 714, a processor that controls one or more components of access terminal 202, and/or a processor that both analyzes information received by receiver 702, generates information for transmission by transmitter 714, and controls one or more components of access terminal 202.

Access terminal 202 can additionally comprise memory 708 that is operatively coupled to processor 706 and that can store data to be transmitted, received data, and any other suitable information related to performing the various actions and functions set forth herein. For instance, memory 708 can store group-specific signaling constraints employed by one or more base stations. Memory 708 can additionally store protocols and/or algorithms associated with identifying signaling constraints used for communicating resource block assignments and/or employing such signaling constraints to analyze received assignment messages.

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Receiver 702 is further operatively coupled to a status report generator 710 which can provide facilities and functionalities substantially similar to those depicted in connection with detection component 206, report generation component 208, and status report prohibit timer component 210 illustrated in FIG. 2. Status report generator 710 can be employed to facilitate and/or effectuate formation and/or dispatch of radio link control (RLC) protocol status reports. Access terminal 202 still further comprises a modulator 712 and a transmitter 714 that transmits the signal to, for instance, a base station, another access terminal, etc. Although depicted as being separate from the processor 706, it is to be appreciated that status report generator 710 and/or modulator 712 can be part of processor 706 or a number of processors (not shown).

Figure 8:
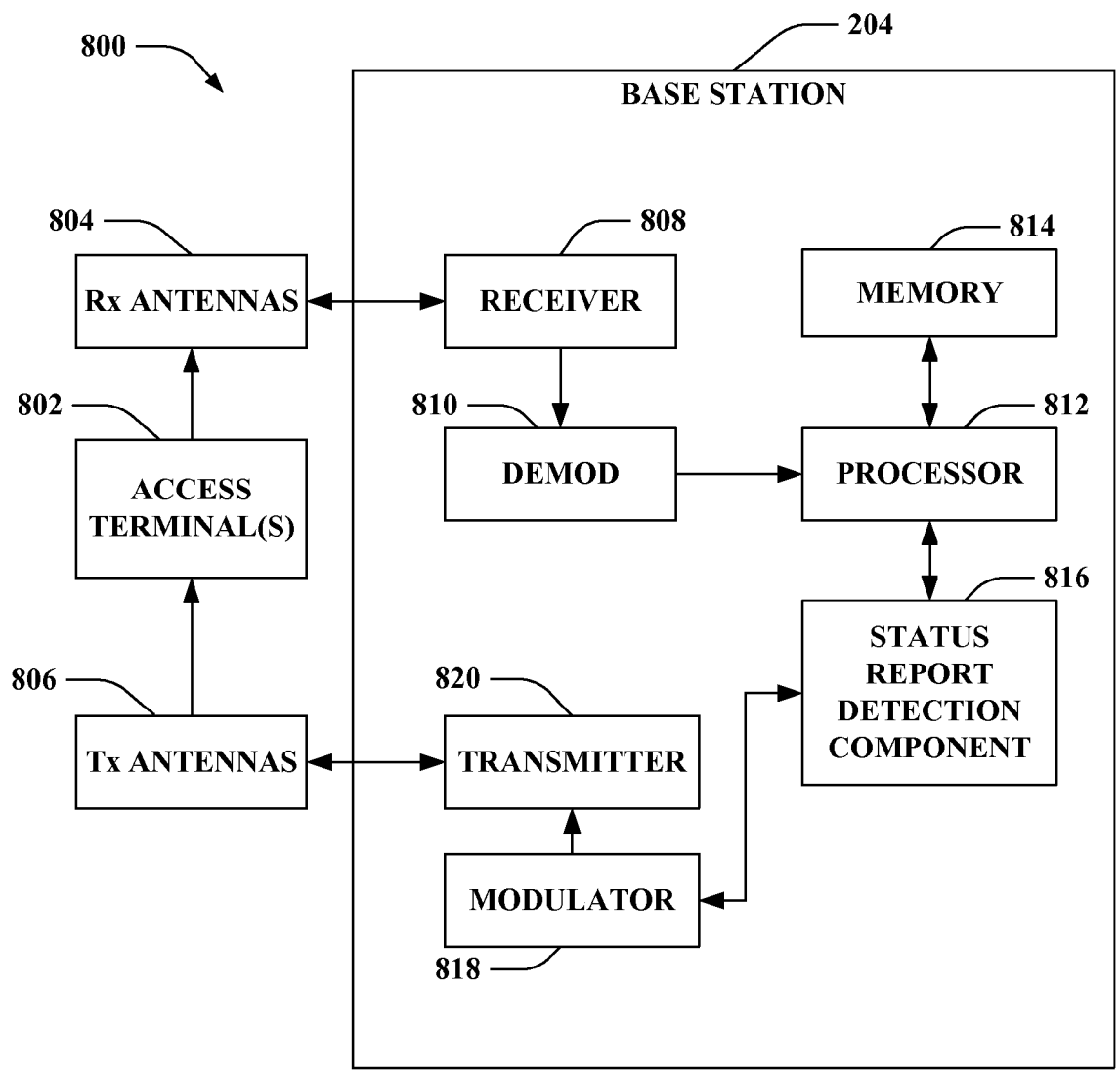
FIG. 8 is an illustration of an example system that forms and/or sends radio link control (RLC) protocol status reports in a wireless communication environment.

FIG. 8 is an illustration of a system 800 that effectuates and/or facilitates receipt and/or processing of radio link control (RLC) protocol status reports. System 800 comprises a base station 204 (e.g., access point, . . . ) with a receiver 808 that receives signal(s) from one or more access terminals 202 through a plurality of receive antennas 804, and a transmitter 820 that transmits to the one or more access terminals 802 through a transmit antenna 806. Receiver 808 can receive information from receive antennas 804 and is operatively associated with a demodulator 810 that demodulates received information. Demodulated symbols are analyzed by a processor 812 that can be similar to the processor described above with regard to FIG. 7, and which is coupled to a memory 814 that stores data to be transmitted to or received from access terminal(s) 802 (or a disparate base station (not shown)) and/or any other suitable information related to performing the various actions and functions set forth herein. Processor 812 is further coupled to a status report detection component 816 that facilitates receipt and/or processing of radio link control (RLC) protocol status reports. Further, status report detection component 816 can provide information to be transmitted to a modulator 818. Modulator 818 can multiplex a frame for transmission by a transmitter 820 through antennas 806 to access terminal(s) 802. Although depicted as being separate from the processor 812, it is to be appreciated that status report detection component 816 and/or modulator 818 can be part of processor 812 or a number of processors (not shown).

Figure 9:
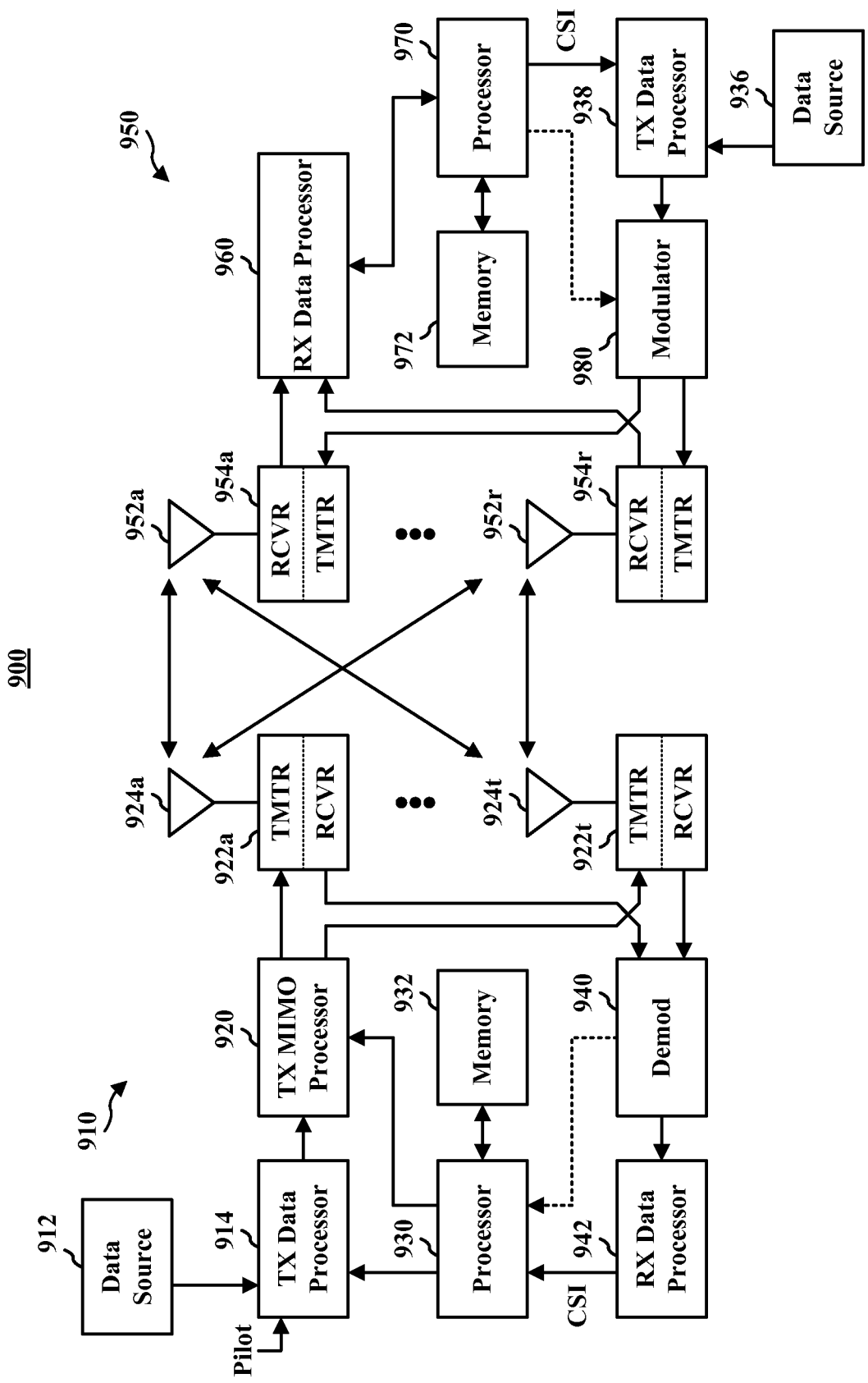
FIG. 9 is an illustration of an example wireless network environment that can be employed in conjunction with the various systems and methods described herein.

FIG. 9 shows an example wireless communication system 900. The wireless communication system 900 depicts one base station 910 and one access terminal 950 for sake of brevity. However, it is to be appreciated that system 900 can include more than one base station and/or more than one access terminal, wherein additional base stations and/or access terminals can be substantially similar or different from example base station 910 and access terminal 950 described below. In addition, it is to be appreciated that base station 910 and/or access terminal 950 can employ the systems (FIGS. 1-4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At access terminal 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which available technology to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from access terminal 950 are received by antennas 924, conditioned by receivers 922, demodulated by a demodulator 940, and processed by a RX data processor 942 to extract the reverse link message transmitted by access terminal 950. Further, processor 930 can process the extracted message to determine which preceding matrix to use for determining the beamforming weights.

Processors 930 and 970 can direct (e.g., control, coordinate, manage, etc.) operation at base station 910 and access terminal 950, respectively. Respective processors 930 and 970 can be associated with memory 932 and 972 that store program codes and data. Processors 930 and 970 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, ... ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PS-DCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
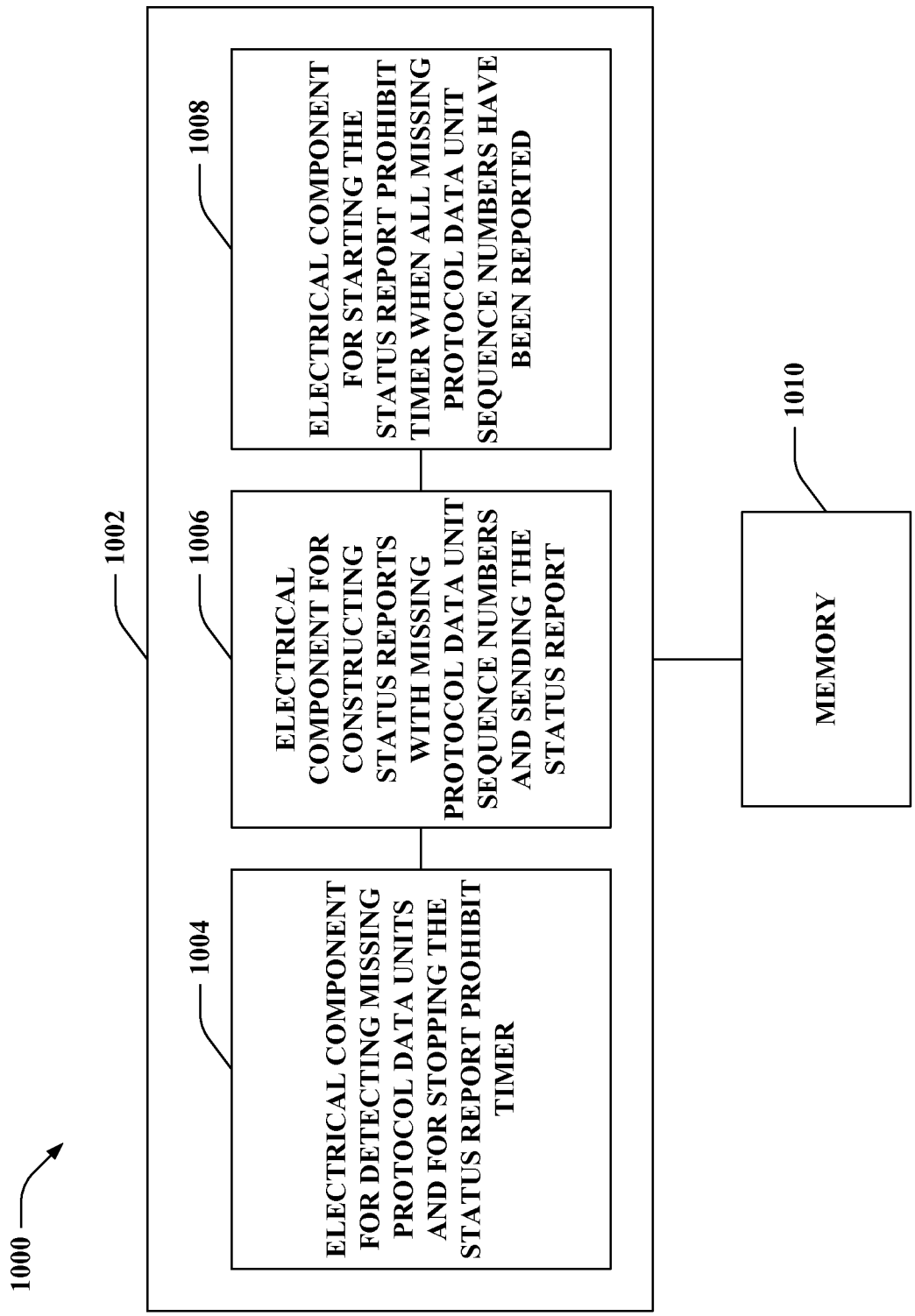
FIG. 10 is an illustration of an example system that forms and/or sends radio link control (RLC) protocol status reports in a wireless communication environment.

With reference to FIG. 10, illustrated is a system 1000 that effectuates and/or facilitates formation and/or dispatch of radio link control (RLC) protocol status reports in a wireless communication environment. For example, system 1000 can reside at least partially within an access terminal. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for detecting missing protocol data units (PDUs) and for stopping the status report prohibit timer 1004. Further, logical grouping 1002 can include an electrical component for constructing status reports with missing protocol data unit sequence numbers and sending the status report 1006. Moreover, logical grouping 1002 can comprise an electrical component for starting the status report prohibit timer when all missing protocol data unit sequence numbers have been reported 1008. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
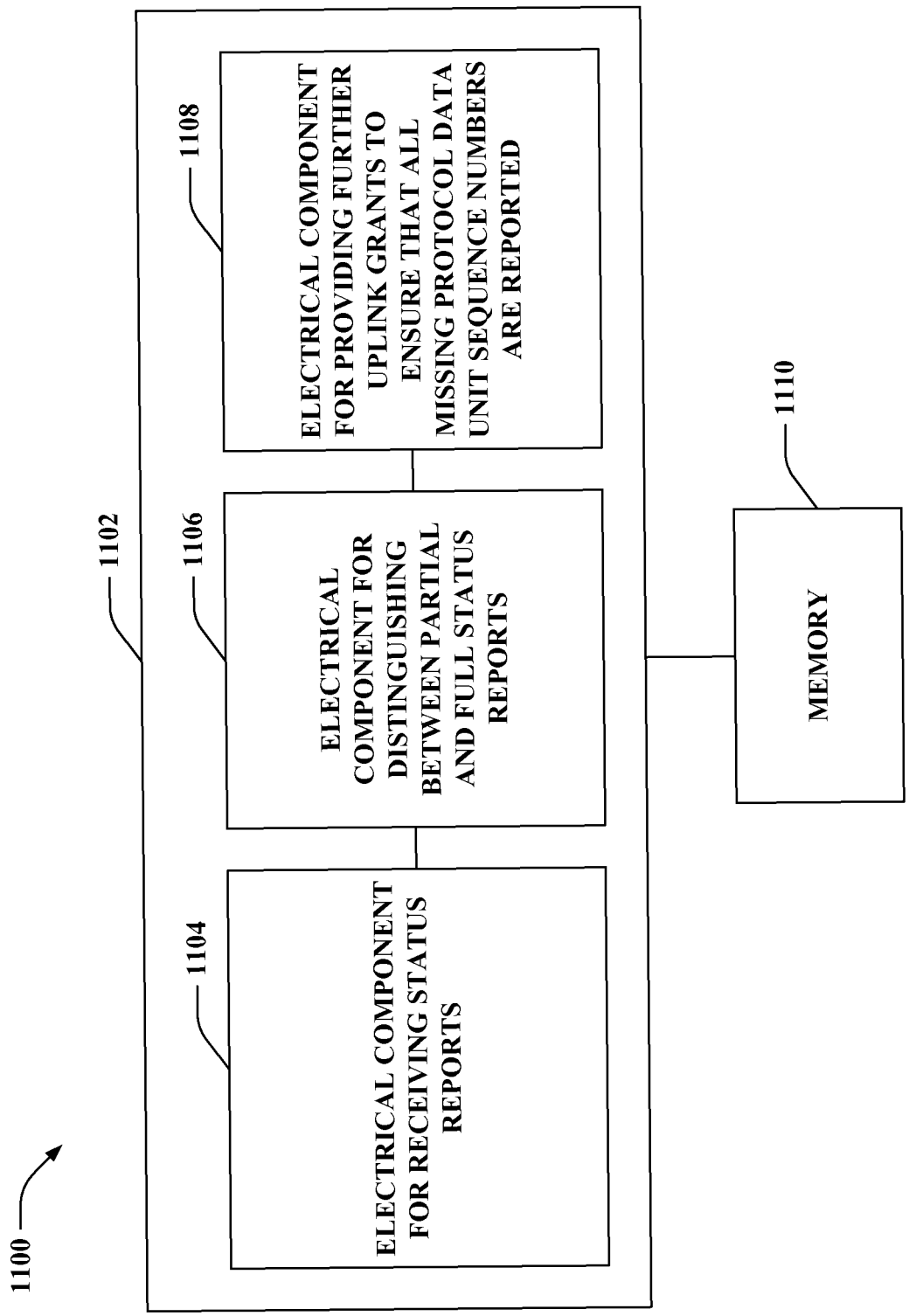
FIG. 11 is an illustration of an example system that forms and/or sends radio link control (RLC) protocol status reports in a wireless communication environment.

Turning to FIG. 11, illustrated is a system 1100 that effectuates and/or facilitates receipt of radio link control (RLC) protocol status reports in a wireless communication environment. System 1100 can reside within a base station, for instance. As depicted, system 1100 includes functional blocks that can represent functions implemented by a processor, software, or combination thereof (e.g., firmware). System 1100 includes a logical grouping 1102 of electrical components that can act in conjunction. Logical grouping 1102 can include an electrical component for receiving status reports 1104. Further, logical grouping 1102 can include an electrical component for distinguishing between partial and full status reports 1106. Moreover, logical grouping 1102 can include an electrical component for providing further uplink grants to ensure that all missing protocol data unit (PDU) sequence numbers are reported 1108. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus operable in a wireless communication system, the apparatus comprising:
   a processor, configured for
   quantifying an absence of protocol data units, based at least in part on the quantifying ascertaining whether a number of absent protocol data units exceeds a grant from a transmission side,
   inserting a sequence number associated with a first absent protocol data unit into an acknowledgement sequence number field associated with a partial status report,
   including the sequence number associated with the first absent protocol data unit in the partial status report,
   including sequence numbers associated with absent protocol data units subsequent to the first absent protocol data units into the partial status report without exceeding the grant from the transmission side, and dispatching the partial status report to a base station; and
   a memory coupled to the processor for persisting data.

2. The apparatus of claim 1, the processor further configured for placing a first timer on hiatus prior to the quantifying.

3. The apparatus of claim 2, the processor further configured for bringing the first timer out of hiatus when the sequence number of a last protocol data unit identified by the quantifying is included in the partial status report.

4. The apparatus of claim 1, the processor further configured for commencing a second timer prior to the inserting, the second timer employed by the processor to ensure that the protocol data units identified by the quantifying are missing.

5. The apparatus of claim 1, where the processor ascertains that the number of absent protocol data units is less than the grant from the transmission side, the processor includes all the absent protocol data units in a single status report.

6. The apparatus of claim 1, the grant from the transmission side is of a variable size and dependent on at least one of environmental conditions surrounding the base station or situational conditions associated with the apparatus.

7. A method utilized in a wireless communication system, the method comprising:
inserting a sequence number associated with a first absent protocol data unit into an acknowledgement sequence number field associated with a status report;
including the sequence number associated with the first absent protocol data unit in the status report;
including sequence numbers associated with absent protocol data units subsequent to the first absent protocol data unit into the status report without exceeding a transmission side grant; and
dispatching the status report to a base station.

8. The method of claim 7, further comprising prior to the inserting, stopping a first timer that controls construction of the status report.

9. The method of claim 8, further comprising restarting the first timer on conclusion of the dispatching, the conclusion of the dispatching signified by an inclusion into the status report of the sequence number associated with a last noted absent protocol data unit received before stopping the first timer.

10. The method of claim 7, further comprising prior to the inserting, waiting for a period of time to verify that at least one of the first absent protocol unit or the further absent protocol data unit is missing.

11. An apparatus operable in wireless communication systems, the apparatus comprising:
means for detecting missing protocol data units and stopping a means for determining time;
means for constructing status reports with sequence numbers of the missing protocol data units, wherein a sequence number associated with a first absent protocol data unit is placed in an acknowledgement sequence number field associated with a status report, and the sequence number associated with the first absent protocol data unit and sequence numbers associated with absent protocol data units subsequent to the first absent protocol data units are included in the status report; and
means for restarting the means for determining time on inclusion of a sequence number associated with a last missing protocol data unit detected prior to stopping the means for determining time.

12. The apparatus of claim 11, the means for constructing status reports inserts a sequence number of a first missing protocol data unit included in the status report into an acknowledgement sequence number field associated with the status report.

13. The apparatus of claim 11, the means for constructing status reports ascertains a quantity of sequence numbers associated with the missing protocol data units that comports with a size of a grant from a transmission side.

14. The apparatus of claim 13, wherein the size of the grant from the transmission side is dependent on an environmental condition associated with a location of the apparatus.

15. The apparatus of claim 11, the means for constructing enters a wait state to verify that the missing protocol data units detected by the means for detecting have not been received by the apparatus.

16. An apparatus operable in wireless communication systems, the apparatus comprising:
a memory that retains instructions related to quantifying an absence of protocol data units, ascertaining whether a quantity of absent protocol data units exceeds a transmission side grant supplied by a base station, including a sequence number associated with a first absent protocol data unit in an acknowledgement sequence number field associated with a status report, placing the sequence number associated with the first absent protocol data unit into the status report, placing sequence numbers associated with absent protocol data units subsequent to the first absent protocol data units into the status report, and transmitting the status report to the base station; and
a processor, coupled to the memory, configured to execute the instructions retained in the memory.

17. The apparatus of claim 16, the memory further retains instructions for stopping a first timer prior to quantifying the absence of protocol data units.

18. The apparatus of claim 17, the memory further retains instructions for starting the first timer on inclusion of a sequence number associated with a last absent protocol data unit into the status report, the last absent protocol data unit identified prior to stopping the first timer.

19. The apparatus of claim 16, the memory further retains instructions for looping for a fixed period of time to verify that each protocol data unit identified by the quantifying as absent is not subsequently received at the expiration of the fixed period of time.

20. A non-transitory computer program product, comprising: a computer-readable medium comprising:
code for including a sequence number associated with a first missing protocol data unit into an acknowledgement sequence number field associated with a status report;
code for placing the sequence number associated with the first missing protocol data unit into the status report;
code for placing sequence numbers associated with absent protocol data units subsequent to the first missing protocol data unit into the status report; and
code sending the status report to a base station.

21. The computer program product of claim 20, wherein the non-transitory computer-readable medium further comprises code for placing a timer on hiatus prior to the including and bringing the timer out of the hiatus when a last sequence number associated with a last missing protocol data unit is inserted into the status report.

22. The computer program product of claim 21, wherein the last missing protocol data unit is identified before the timer is placed on hiatus.

23. An apparatus operable in wireless communication systems, the apparatus comprising:
a processor, configured for
receiving a status report that includes an acknowledgement sequence number field, a sequence number of a first missing protocol data unit, and sequence numbers associated with absent protocol data units subsequent to the first missing protocol data unit, determining that the acknowledgement sequence number field corresponds to the sequence number of the first missing protocol data unit, comparing the sequence number of the first missing protocol data unit with a sequence number of a lowest permissible protocol data unit, and based at least in part on the comparing, supplying a grant from a transmission side to an access terminal; and a memory coupled to the processor for persisting data.

24. The apparatus of claim 23, wherein the supplying further comprises utilizing at least one ambient condition associated with a location of at least one of the apparatus or the access terminal to determine a size of the grant from the transmission side.

25. The apparatus of claim 23, wherein when the comparing indicates that the sequence number of the first missing protocol data unit is less than the sequence number of the lowest permissible protocol data unit, the processor generates the grant from the transmission side.

26. The apparatus of claim 23, wherein when the comparing indicates that the sequence number of the first missing protocol data unit is greater than or equal to the sequence number of the lowest permissible protocol data unit, the processor ascertains that the access terminal has sent a last sequence number associated with a last missing protocol data unit detected by the access terminal.

27. A method employed in wireless communication systems, the method comprising:

obtaining a status report that includes an acknowledgement sequence number field, a sequence number of a first missing protocol data unit, and sequence numbers associated with absent protocol data units subsequent to the first missing protocol data unit;

determining that the acknowledgement sequence number field corresponds to the sequence number of the first missing protocol data unit;

comparing the sequence number of the first missing protocol data unit with a sequence number of a lowest permissible protocol data unit; and based at least in part on the comparing, supplying a grant from a transmission side to an access terminal.

28. The method of claim 27, wherein the comparing further comprising generating the grant from the transmission side when the sequence number of the first missing protocol data unit is less than the sequence number of the lowest permissible protocol data unit.

29. The method of claim 27, wherein a size associated with the grant from the transmission side supplied to the access terminal based on environmental conditions associated with the access terminal.

30. An apparatus operable in wireless communication systems, the apparatus comprising:

means for retrieving a status report that includes an acknowledgement sequence number field a sequence number of a first missing protocol data unit, and sequence numbers associated with absent protocol data units subsequent to the first missing protocol data unit, wherein the acknowledgement sequence number field corresponds to the sequence number associated with the first missing protocol data unit;

means for distinguishing between a partial status report and a full status report; and means for providing further grants from a transmission side to ensure that all missing protocol data units are reported in one of the partial status report or a full status report.

31. The apparatus of claim 30, the means for distinguishing differentiates between the partial status report and the full status report by determining whether the acknowledgement sequence number field associated with the status report contains the sequence number of the first missing protocol data unit.

32. The apparatus of claim 31, wherein the sequence number of the first missing protocol data unit further included in the partial status report.

33. The apparatus of claim 31, wherein the sequence number of the first missing protocol data unit included in the full status report is absent from the acknowledgement sequence number field of the full status report.

34. A non-transitory computer program product, comprising: a computer-readable medium comprising:

code for obtaining a status report that includes an acknowledgement sequence number field, a sequence number of a first missing protocol data unit, and sequence numbers associated with absent protocol data units subsequent to the first missing protocol data unit;

code for determining that the acknowledgement sequence number field corresponds to the sequence number of the first missing protocol data unit;

code for comparing the sequence number of the first missing protocol data unit with a sequence number of a lowest permissible protocol data unit; and based at least in part on the comparing, code for supplying a grant from a transmission side to an access terminal.

35. The computer program product of claim 34, wherein the non-transitory computer-readable medium further comprises code for not generating the grant from the transmission side to the access terminal based on an observation that the sequence number of the first missing protocol data unit is absent from the acknowledgement sequence number field associated with the status report.

36. The computer program product of claim 34, wherein the non-transitory computer-readable medium further comprises code for generating the grant from the transmission side to the access terminal based at least in part on an observation that the sequence number of the first missing protocol data unit is present in the acknowledgement sequence number field associated with the status report and the sequence number of the first missing protocol data unit is included in the status report.

37. An apparatus operable in a wireless communications environment, the apparatus comprising:

a memory that retains instructions related to receiving a status report that includes an acknowledgement sequence number field, a sequence number of a first missing protocol data unit, and sequence numbers associated with absent protocol data units subsequent to the first missing protocol data unit, determining that the acknowledgement sequence number field corresponds to the sequence number of the first missing protocol data unit, comparing the sequence number of the first missing protocol data unit with a sequence number of a lowest permissible protocol data unit, and based at least in part on the comparing, supplying a grant from a transmission side to an access terminal; and a processor, coupled to the memory, configured to execute the instructions retained in the memory.

38. The apparatus of claim 37, wherein the supplying further comprises utilizing at least one ambient condition associated with a location of at least one of the apparatus or the access terminal to determine a size of the grant from the transmission side.

39. The apparatus of claim 37, wherein when the comparing indicates that the sequence number of the first missing protocol data unit is less than the sequence number of the lowest permissible protocol data unit, the processor generates the grant from the transmission side.

40. The apparatus of claim 37, wherein a size associated with the grant from the transmission side supplied to the access terminal is based on environmental conditions associated with the access terminal.

* * * * *